US008556721B2

(12) United States Patent
Aronzon et al.

(10) Patent No.: US 8,556,721 B2
(45) Date of Patent: Oct. 15, 2013

(54) APPARATUS AND METHOD FOR MANAGING PERIPHERAL DEVICE COMMUNICATIONS

(75) Inventors: Michael Aronzon, Toronto (CA); Bruce Hawver, Hawthorn Woods, IL (US); Kim Rom, Valby (DK)

(73) Assignee: Steelseries APS, Valby (DK)

( * ) Notice: Subject to any disclaimer, the term of this patent is extended or adjusted under 35 U.S.C. 154(b) by 493 days.

(21) Appl. No.: 12/619,070

(22) Filed: Nov. 16, 2009

(65) Prior Publication Data
US 2011/0118022 A1 May 19, 2011

(51) Int. Cl.
A63F 13/00 (2006.01)
(52) U.S. Cl.
USPC ........ 463/39; 463/1; 463/36; 463/37; 463/38; 463/43; 463/47
(58) Field of Classification Search
USPC ................ 463/1, 36–39, 42, 47, 43
See application file for complete search history.

(56) References Cited

U.S. PATENT DOCUMENTS

| 6,071,194 | A  * | 6/2000  | Sanderson et al. ............ 463/37 |
| 6,997,803 | B2 * | 2/2006  | LeMay et al. ................. 463/20 |
| 7,351,147 | B2 * | 4/2008  | Stockdale et al. ............ 463/29 |
| 7,412,542 | B1 * | 8/2008  | Newson et al. ............... 709/249 |
| 7,606,920 | B2 * | 10/2009 | Van Datta et al. ............ 709/230 |
| 7,704,741 | B2 * | 4/2010  | Fuhr et al. .................... 435/400 |
| 7,854,655 | B2 * | 12/2010 | Mao et al. ..................... 463/30 |
| 7,991,890 | B2 * | 8/2011  | Schmidt et al. ............... 709/226 |
| 2004/0229698 | A1 * | 11/2004 | Lind et al. ................... 463/42 |
| 2006/0084504 | A1 * | 4/2006  | Chan et al. ................... 463/39 |
| 2007/0173326 | A1 * | 7/2007  | Jennings et al. .............. 463/42 |

* cited by examiner

*Primary Examiner* — Dmitry Suhol
*Assistant Examiner* — Ryan Hsu
(74) *Attorney, Agent, or Firm* — Guntin & Gust, PLC; Douglas Schnabel

(57) ABSTRACT

A system that incorporates teachings of the present disclosure may include, for example, a first peripheral device having a controller to store operational settings tailored for a gaming application, interact with the gaming application using the operational settings and user inputs, and share the operational settings with a second peripheral device for use with the gaming application. Additional embodiments are disclosed.

19 Claims, 10 Drawing Sheets

100

800

APPARATUS AND METHOD FOR MANAGING PERIPHERAL DEVICE COMMUNICATIONS

FIELD OF THE DISCLOSURE

The present disclosure relates generally to gaming applications, and more specifically to an apparatus and method for managing peripheral device communications.

BACKGROUND

As video games become more realistic, the user interaction becomes more complicated. A user often has his or her own preferences for interacting with the peripheral devices, which can enhance the gaming experience for the user.

However, users often play video games at various gaming consoles. These gaming consoles can be at remote locations and can have different peripheral devices from the ones that the user typically utilizes.

DETAILED DESCRIPTION

One embodiment of the present disclosure can entail a method including generating operational settings tailored for a gaming application, storing the operational settings in a first peripheral device, receive operational inputs associated with the operational settings, interacting with the gaming application using the first peripheral device and the operational inputs; and sharing the operational settings with a second peripheral device for use with the gaming application.

One embodiment of the present disclosure can entail a first peripheral device including a controller to store operational settings tailored for a gaming application, interact with the gaming application using the operational settings and user inputs, and share the operational settings with a second peripheral device for use with the gaming application.

One embodiment of the present disclosure can entail a computer readable storage medium comprising computer instructions for storing operational settings in a first peripheral device where the operational settings are tailored for a gaming application, receiving operational inputs associated with the operational settings, interacting with the gaming application using the first peripheral device and the operational inputs, and performing at least one of: sharing the operational settings with a second peripheral device for use with the gaming application; and receiving the operational settings at the first peripheral device from a server that is remote from a gaming console that is hosting the gaming application.

Figure 1:
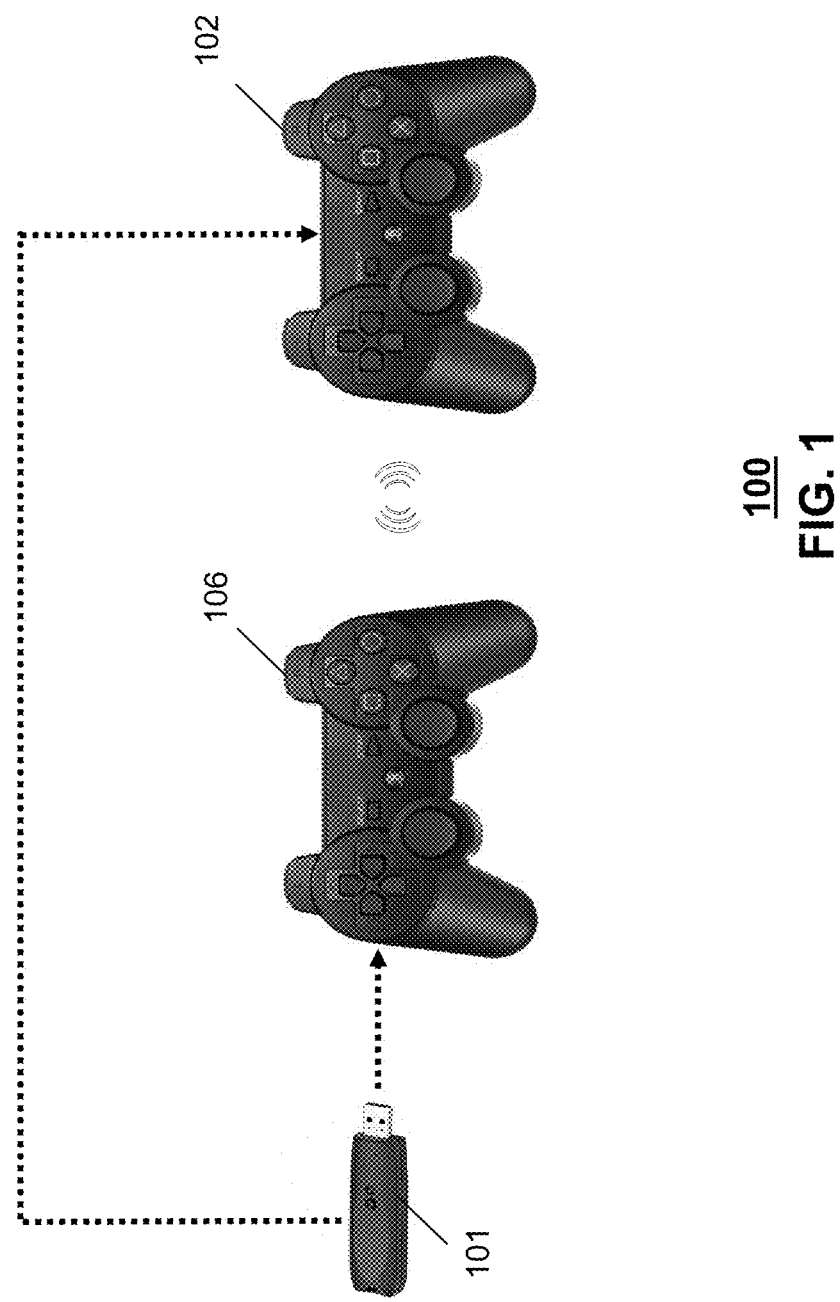
FIGS. 1 and 2 depict illustrative embodiments for gaming systems according to the present disclosure.

In FIG. 1, a portion of a gaming system is shown and generally represented by reference numeral 100. System 100 can include a number of peripheral devices, such as gaming controllers or peripheral devices 102 and 106. The devices 102 and 106 are capable of receiving user inputs and interacting with a computing device (not shown), such as a gaming console. The peripheral devices can be of various types including a keyboard, a joystick, a gaming console controller, a computer mouse, a headset, or other common accessories used with a computing device.

The peripheral device 102 can also serve as an accessory where operational settings can be stored and/or generated. In one embodiment, the peripheral device 102 can generate the operational settings, including actuator macros, independently from the gaming console. However, the present disclosure also contemplates the operational settings being generated in cooperation with the gaming console, such as receiving information from the gaming console and generating the operational settings using the received information along with user inputs at the peripheral device 102. In another embodiment, the operational settings can be generated by a server or other computing device (including independently of the peripheral device 102) and then transmitted to the peripheral device.

A sequence of actuator depressions and navigation movements can also be generated and recorded at the device 102. The sequence of accessory stimuli recorded from any of these accessories coupled to the computing device can be converted into one or more macros which can direct operations of a software application such as for example, without limitation, a gaming application which is controllable by the device 102. The computing device can also record in the macro the timing of how the sequence of accessory stimuli is created.

Once macros or operational settings are generated, they can be transmitted by the first peripheral device 102 to a second peripheral device 106 for later use. The macro can be stored in a profile, and can be associated with one or more buttons (or combination of buttons) or other manipulations (e.g., rapid shaking on a surface or a specific movement such as a circle) of the device 102 to be invoked at a later time when utilizing the peripheral device to navigate and/or control operations of a software application communicatively coupled to the peripheral device by way of the computing device tethered by a USB cable or wireless interface.

Once one or more operational parameters of the peripheral device 102 have been programmed along with one or more macros, the peripheral device 102 can await a selection of these programmed parameters individually or in a profile for use with a software application chosen by the user. The selection of individual parameters or a profile can take place by way of a menu system or other user interface.

Once a selection is detected, the peripheral device 102 can retrieve from its memory the profile (or alternatively individual programmed settings) for use with the desired software application (e.g., an online game such as World of War Craft, or a game operating in a gaming console, etc.). Once these programming options have been retrieved, the device 102 can begin to invoke these options while interacting with the computing device from which the peripheral device can access the desired software application.

The exemplary embodiments include a technique for programming operational parameters of a peripheral device 102 without assistance from a computing device communicatively coupled thereto. In an embodiment where the peripheral device 102 represents a computer mouse, the computer mouse in accordance with the method can be said to be driver independent. That is, the computer mouse can have a plurality of options to program operational parameters that control the function of the computer mouse without programming assistance of an external computing device such as a desktop computer. Accordingly, a user of such a computer mouse can easily port user-programmed features of this device between computers without having to establish settings in an operating system, or a software application such a gaming application. Such portability provides the user the flexibility of interacting with software applications on any computing device with ease, and timeliness.

The exemplary embodiments allow for sharing peripheral device profiles and settings between different devices using various methods of communication, including: device to device (e.g., WiFi, Bluetooth, IR, RFID, wireless USB, etc.); device from/to network/server; and device from/to game/TV terminal. The exemplary embodiments can also perform remote configuration using cloud computing. For example, a user can configure his peripheral device at any time and at any place. The technique used for operational setting access can vary, but can include an internet-based connection to a server. This can allow for accessing a centralized profile storage.

The exemplary embodiments allow for sharing operational settings in various embodiments. For instance, if two users are at the same LAN center and one desires to try playing with the others settings then these operational settings can be transmitted directly from one device to the other device. In another embodiment, a user at a LAN center who cannot load software on their PC but desires to change the settings on any of the user's equipment can go to a server-based solution where the settings are stored and have those settings (or a version thereof) transmitted to the user's device.

Figure 2:
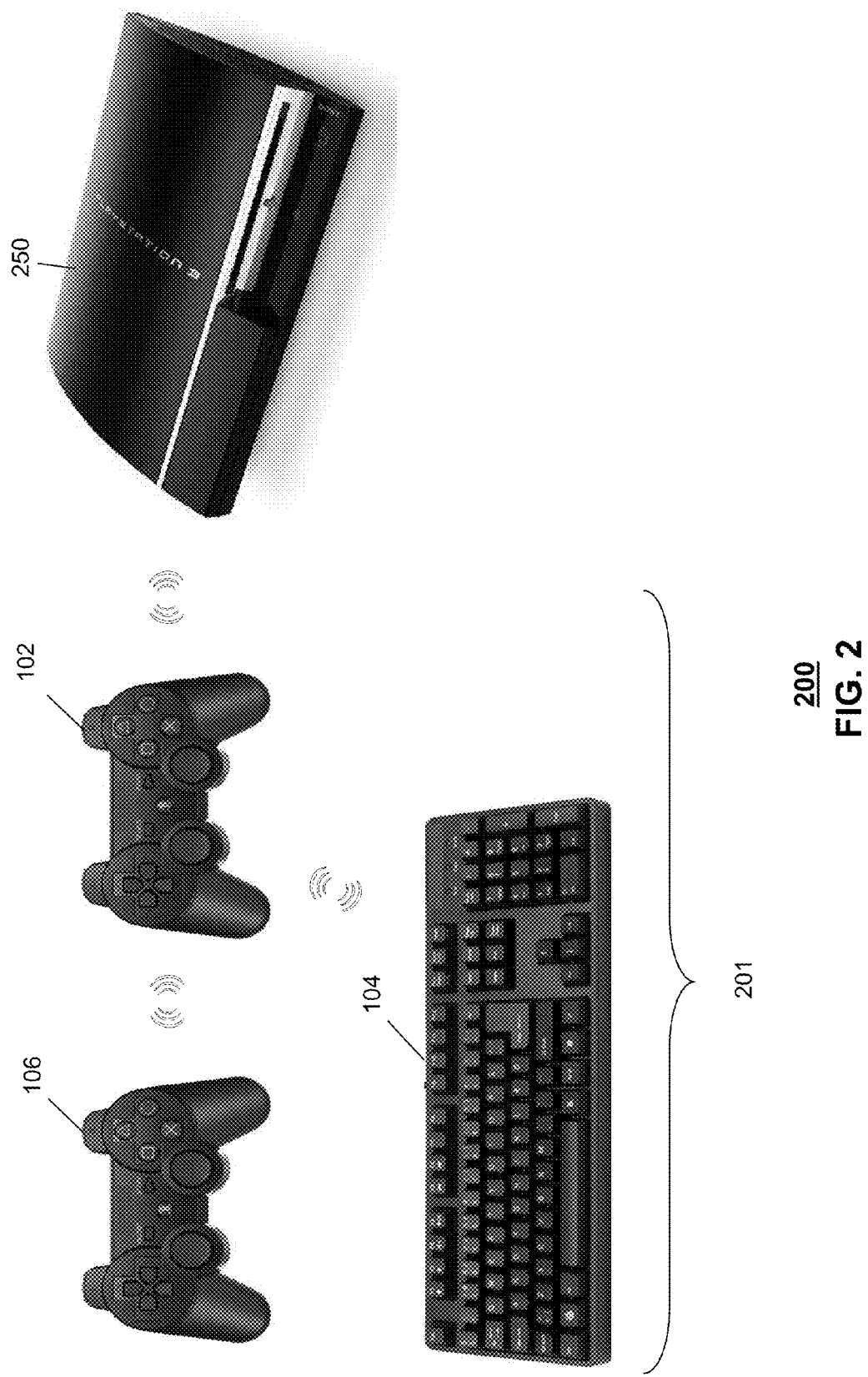

In FIG. 2, a gaming system is shown and generally represented by reference numeral 200. System 200 can include a computing device 250, such as a gaming console. The gaming console 250 can removably receive gaming software applications, such as stored on CDs and other removable storage medium. However, the exemplary embodiments can also include dedicated gaming software applications that are stored on a hardrive or other memory device of the console, and can further access remote gaming software applications, such as over the Internet. System 200 can include a plurality of peripheral devices or controllers 201 (e.g., peripheral devices 102, 104 and 106) that different users can utilize for playing video games or otherwise interacting with the gaming console 250. The type of peripheral devices can vary and can include a joystick, keyboard, mouse, microphone or any other device that provides an interface with the gaming console 250. In one embodiment, system 200 can provide for networking of a plurality of gaming consoles 250 so that users at different computing devices can play video games with each other, such as on-line gaming (e.g., Massively Multi-player Online (MMO) games).

In one embodiment, one or more remote servers (such as media servers that are not shown) can be operably coupled with the gaming consoles 250 for facilitating the playing of video games. For instance, the remote servers can be used for presentation of a gaming software application in coordination with each of the computing devices. In such an example, the presentation of the gaming software application can be in temporal proximity to each other for each of the computing devices. An example of this type of video game environment is MMO video games where users can interact with each other in a virtual world and often see similar displays of the virtual world.

As will be explained again later, a Remote Access Control (RAC) application can be invoked so that two or more of the peripheral devices 201 can be used to control the actions associated with a single player of the gaming software application. For example, a gaming software application can present a graphical representation of a person that is capable of performing a number of actions (e.g., running, jumping, aiming, shooting and so forth). Control over these actions would typically be performed by a single peripheral device such as a joystick where the joystick has a plurality of actuators (e.g., buttons and joystick) that can be actuated individually or in combination to perform the actions. Invoking the RAC application allows the use of two or more peripheral devices to exert control over these actions. For example, a first joystick can be used to control the movement of the graphical representation of the person while the buttons on a second joystick can be used for jumping and shooting. Various combinations of actions and/or actuators can be designated between the plurality of peripheral devices. In one embodiment, control over actions can be shared between the peripheral devices, such as allowing multiple peripheral devices to control shooting through depressing a button on each of the devices.

In one embodiment, peripheral device 102 can be a primary control device that transmits control signals to the gaming console 250 for exerting control over the single player of the gaming software application. One or more secondary control devices, such as peripheral devices 104 and 106 can also be utilized to exert control over the single player. Peripheral device 102 can receive control signals from the other peripheral devices and transmit those control signals to the gaming console.

In one embodiment, the control signals received by peripheral device 102 can be processed and then transmitted to the gaming console along with control signals that are generated by the peripheral device 102 based on user inputs received at the peripheral device (e.g., movement of the joystick of peripheral device 102). The processing by the peripheral device 102 can include determining whether the received control signals are for an action that is permitted pursuant to the RAC application. For example, the user may desire to allow only movement of the single player to be controlled by the peripheral devices 104 or 106 while all other actions remain under the control of peripheral device 102. In this example, the peripheral device 102 can determine if the received control signals are associated with movement and accept those signals while ignoring signals associated with other actions. The received control signals can be reformatted by the peripheral device 102 for transmission to the gaming console 250 and/or can be directly transmitted to the gaming console. The exemplary embodiment contemplates various configurations of control to be allowed amongst the plurality of peripheral devices. For example, more than one secondary device can be allowed to control an action (e.g. shooting) while only one peripheral device (such as the primary device) is permitted to control the movement of the single player.

Figure 3:
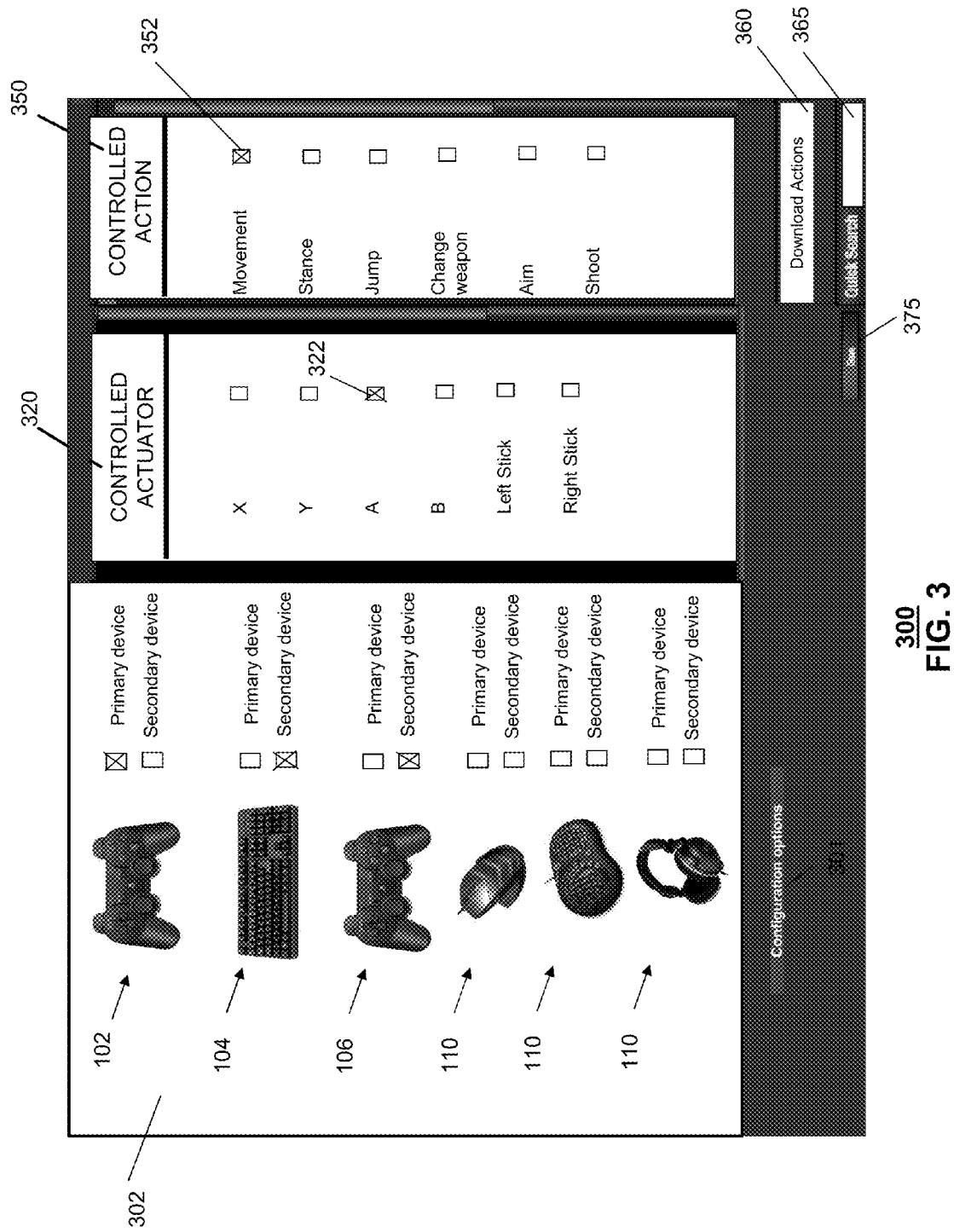
FIG. 3 depicts an illustrative embodiment of a Graphical User Interface (GUI) generated by a computing device according to the present disclosure.

FIG. 3 depicts an illustrative embodiment of a Graphical User Interface (GUI) 300 for implementing Remote Access Control, such as generated by the RAC application according to the present disclosure. The GUI 300 can be manipulated through use of any number of devices, including keyboards, joysticks and so forth. The RAC application can operate in a computing device such as a desktop computer, a laptop computer, a server, a mainframe computer, or a gaming console.

The RAC application can also operate in other computing devices with less computing resources such as a cellular phone, a personal digital assistant, a media player (such as an iPOD™), and a peripheral device (e.g., a joystick). The RAC can also operate in multiple environments, such as in both the gaming console and the peripheral device. From these illustrations it would be apparent to an artisan with ordinary skill in the art that the RAC application can operate in any device with computing resources, as well as in a distributed environment. For example, a user's computing device can communicate with the RAC application that is running on a media server or other remote computing resource.

GUI 300 provides the capability of implementing multiple control sources for one or more gaming software applications that are presented by a computing device. GUI 300 can include configuration options 301 with an options window 302 that allows for designating the peripheral devices that are to be used in the multiple control source scheme. The particular individual that is provided with access to GUI 300 can vary, such as a parent, and for simplicity will be referred to herein as the administrator. Password protection or other techniques can be utilized to provide limited access to the GUI 300 so that the remote access control can be maintained by the individual who is intended to have such control. The particular type of peripheral device can vary and can include joysticks 102 and 106, keyboard 104, and other devices 110 (e.g., mouse, microphone/earphones, or other devices) that allow users to interact with the computing device and the gaming software application.

GUI 300 can include configuration options that include designating a particular peripheral device as a primary device or as a secondary device. Other designations as to the particular devices can also be provided, such as peripheral devices that communicate directly with the gaming console and peripheral devices that communicate with other peripheral devices. Priority peripheral devices can also be designated so that control signals from a first device take priority over control signals from one or more other devices in the event of conflicting control signals, such as where control is being exerted over the movement of a single player by two different peripheral devices.

GUI 300 can also include actuator options 320 so that the administrator can designate one or more actuators of a particular peripheral device that will be permitted to exert control over the single player, such as by selecting box 322. GUI 300 can also include action options 350 so that the administrator can designate one or more actions of the single player that can be controlled by the particular peripheral device, such as by selecting box 352. Save button 375 can be depressed to store the configuration options, such as at the gaming console 250, at one or more of the peripheral devices, and/or at a remote server (not shown).

In one embodiment, the administrator can download or otherwise access a list of available actions and/or actuators that can be controlled according to the RAC scheme, such as according to a particular gaming software application, through use of download button 360. The administrator can perform a search for such actions, including according to the title of a gaming software application, through search bar 365.

In one embodiment, to implement parental control, the administrator can designate a particular action that he or she deems inappropriate as controllable only by a secondary device. The secondary device can then be used only by certain users so that children cannot perform the restricted action. Continuing with this example, the peripheral devices can have identification components and/or techniques associated therewith so that use of a particular peripheral device can be limited to certain individuals.

For instance, a finger print scanner or voice recognition module can be incorporated into the peripheral device so that only a designated adult user can utilize the secondary peripheral device that has the ability to perform the restricted action. In this example, the RAC application can disable the action being performed by the primary device while enabling the action being performed by the secondary device. The use of the terms primary and secondary is intended to provide a distinction between the devices themselves but is not intended to limit the particular functions that can be performed by the peripheral devices as described by the exemplary embodiments.

In one embodiment, the configuration options 301 can include selections for the technique that is utilized in the identification of the user of the peripheral device. For instance, the administrator can designate the time periods of obtaining or otherwise detecting the identification information (such as the finger print scanning). The time periods can vary such as continuous monitoring of the finger print information or periodic monitoring. Continuing with this example, the administrator may desire to have monitoring performed over short time periods so that an authorized user is unable to commence interaction with the video game and then have an unauthorized user continue the interaction.

In another embodiment, the monitoring can be pursuant to a prompt or other reminder provided to the user so that the user is not required to continuously depress a particular scanner or otherwise provide biometric information in a continuous fashion. For example, a visual and/or audio prompt can be provided to the user which allows the user to place his or her finger on the finger print scanner or otherwise provide the biometric and/or identification information to the peripheral device. The user can be allowed a response period to provide the identification information after which the gaming software application is paused or otherwise stopped. In one embodiment, the user can be periodically prompted to speak a predetermined word which is then processed using voice recognition to make an identification determination.

In another embodiment, the controllable actions can be customized for particular video games that are associated with the particular computing device, such as video games that have been purchased by users associated with the computing device. Continuing with this example, as a video game is purchased, a media server or other remote resource can be made aware of the purchase (such as by being notified via the Internet by a retailer) and can update the computing device based on a database of potentially undesired content that has been determined for the particular video game and stored in a database accessible by the media server.

In one embodiment, GUI 300 can be used for generating or adjusting user profiles for users associated with the computing device. The user profiles can be stored on a memory of the computing device for access by the RAC application and/or can be stored in a remote database accessible by the computing device. The user profiles can then be accessed for implementation of the RAC scheme. For example, a user profile can include configuration options for a particular user so that the user can commence playing a video game using a first peripheral device and have other peripheral devices available to other users to share in the control of the single player presented by the gaming software application.

In one embodiment, the GUI 300 can provide for storing identification information, such as a finger print sample or biometric parameter, that is to be used later for identifying the user of a particular peripheral device. For example, the GUI 300 can request that the user place his or her finger on the scanner for obtaining the sample from which future monitoring will be determined. Similarly, a voice sample can be obtained that can be later used for voice recognition monitoring.

Figure 4:
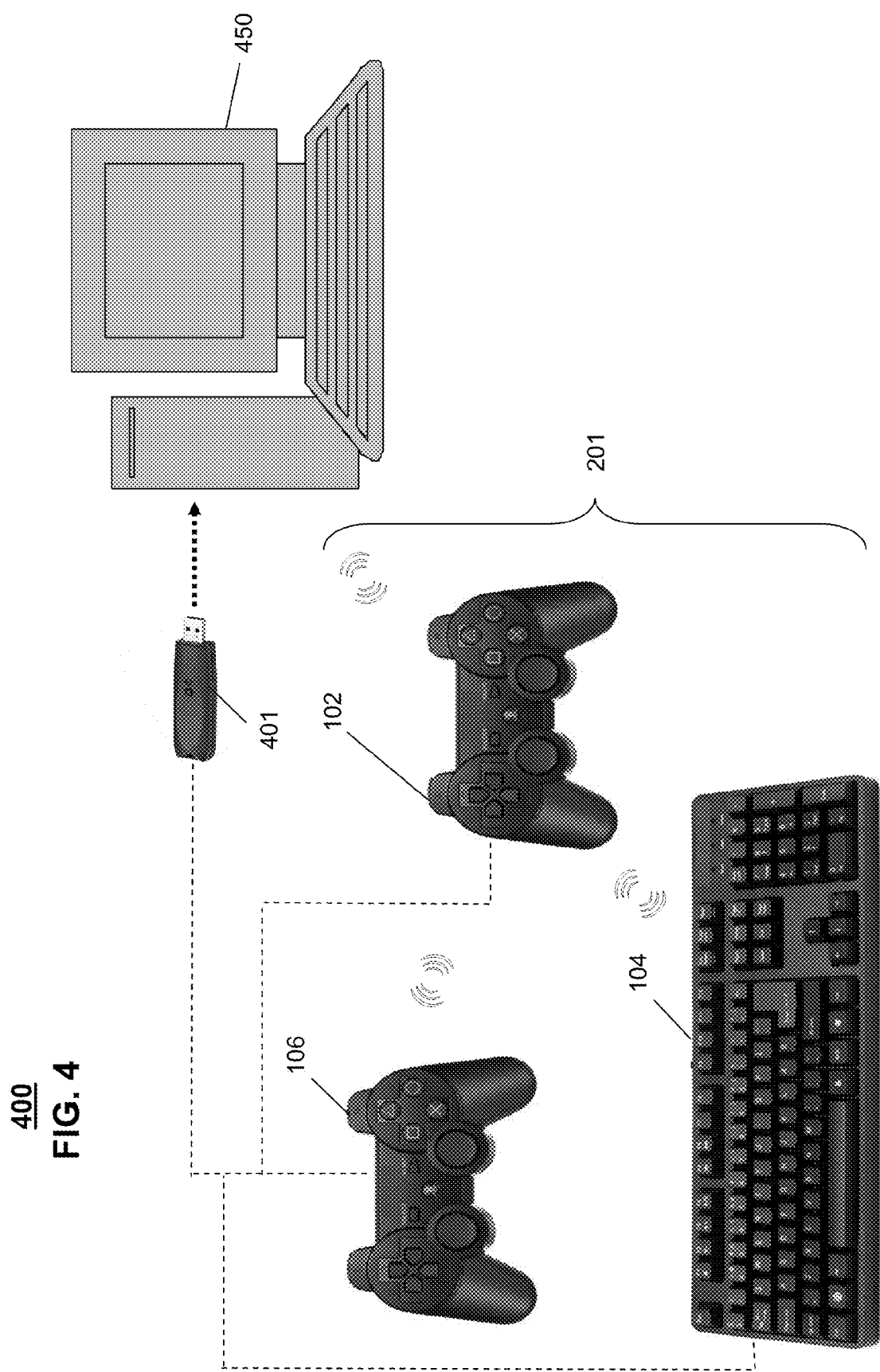
FIGS. 4-5 depict illustrative embodiments for gaming systems that can implement the GUI of FIG. 3.

In FIG. 4, a video gaming system is shown and generally referred to by reference numeral 400. The system includes a computing device 450 and one or more gaming accessories or peripheral devices 201 (such as joysticks 102, 106 and keyboard 104 for interaction by a user with a gaming software application of the computing device. The computing device 450 can be of various types including personal computers, gaming consoles and so forth. The peripheral devices 101 can also be of various types and can be in communication with the computing device 450 and/or each other through wireless and/or wired communications.

In one embodiment, a portable apparatus 401 can be programmable by the RAC application for facilitating the use of the RAC scheme and/or user profiles. In this illustration, the portable apparatus 401 can take the form of a Universal Serial Bus (USB) dongle or other removable memory device (herein referred to as dongle 401). The dongle 401 can be communicatively coupled to the computer 450 such as by the physical interface (e.g., a USB port) or a wireless interface (e.g., Bluetooth or Wireless Fidelity (WiFi)). The dongle 401 can be used for transferring data associated with a user and/or a peripheral device to other devices that may or may not be associated with the user. For example, when a user goes to play a video game at his or her friend's house then the dongle 401 can be utilized as part of implementing the RAC scheme so that the child can exert control over the video game while others can simultaneously exert control over the video game using other peripheral devices.

The dongle 401 can also be used with the peripheral devices 201 such as being interfaced therewith (physical and/or wireless) for transfer of identification and/or configuration information. In one embodiment, the dongle 401 can be used to provide the peripheral devices 201 with the permissible control information, such as remotely controllable actions.

Figure 5:
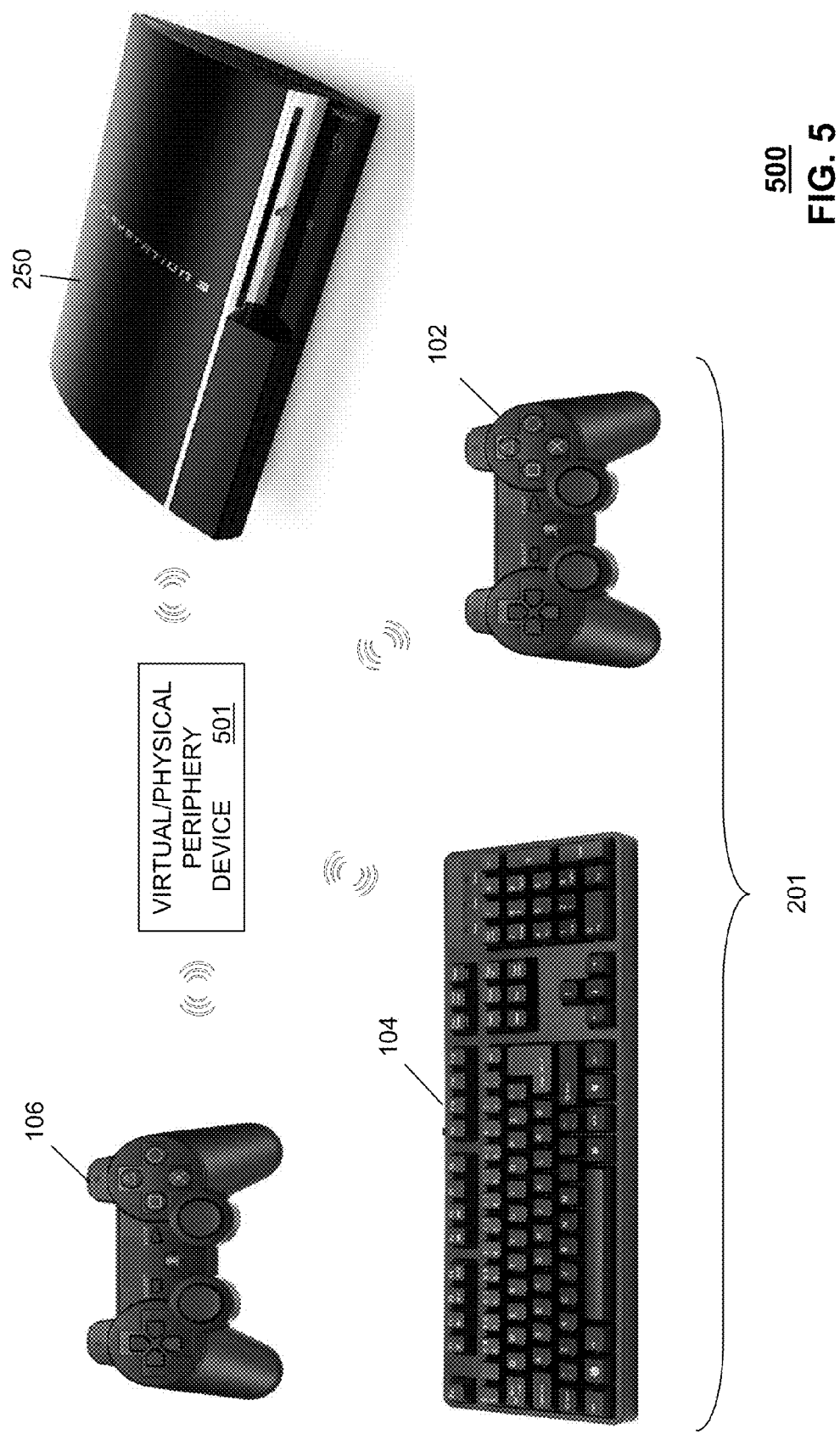

In FIG. 5, a gaming system is shown and generally represented by reference numeral 500. System 500 can include a computing device 250, such as a gaming console. System 500 can include a plurality of peripheral devices or controllers 201 (e.g., peripheral devices 102, 104 and 106) that different users can utilize for playing video games or otherwise interacting with the gaming console 250. The type of peripheral devices can vary and can include a joystick, keyboard, mouse, microphone or any other device that provides an interface with the gaming console 250. In one embodiment, system 500 can provide for networking of a plurality of gaming consoles 250 so that users at different computing devices can play video games with each other, such as on-line gaming (e.g., Massively Multi-player Online (MMO) games).

In one embodiment, system 500 allows the peripheral devices 201 or a portion thereof, to communicate control signals associated with a single player of the gaming software application directly to the gaming console 250. In this illustration, this technique is represented by the use of the virtual peripheral device 501. The virtual peripheral device 501 represents the ability of the gaming console to receive control signals from different sources (e.g., peripheral devices 102, 104 and 106) and to apply those control signals to a single player during presentation of a gaming software application. For instance, the virtual peripheral device 501 can be software and/or hardware incorporated into, removable connectable to or otherwise accessible by the gaming console that provides for the RAC scheme of player control.

In another embodiment, the system 500 can include a physical peripheral device 501 that receives control signals from different sources (e.g., peripheral devices 102, 104 and 106). The control signals can then be transmitted to the gaming console 250 either directly or after signal processing so that the gaming console 250 can apply those control signals to a single player during presentation of a gaming software application. For instance, the device 501 can receive control signals from multiple sources and can identify which of those control signals are to be applied to exert control over the single player and which of those control signals can be ignored. The multiple sources can be at different locations, including locations that are remote from each other. The relevant control signals can be processed and forwarded to the gaming console 250 for playing of the video game which allows two or more users to then control various actions associated with a single player. In one embodiment, the device 501 can be a removable device that can be selectively connected to the gaming console 250 to allow for the RAM scheme. In another embodiment, the multiple sources can be at remote locations and can be viewing the video game at different monitors. The present disclosure contemplates the peripheral devices and/or the gaming console to be in communication via wireless and/or hardwire links.

Figure 6:
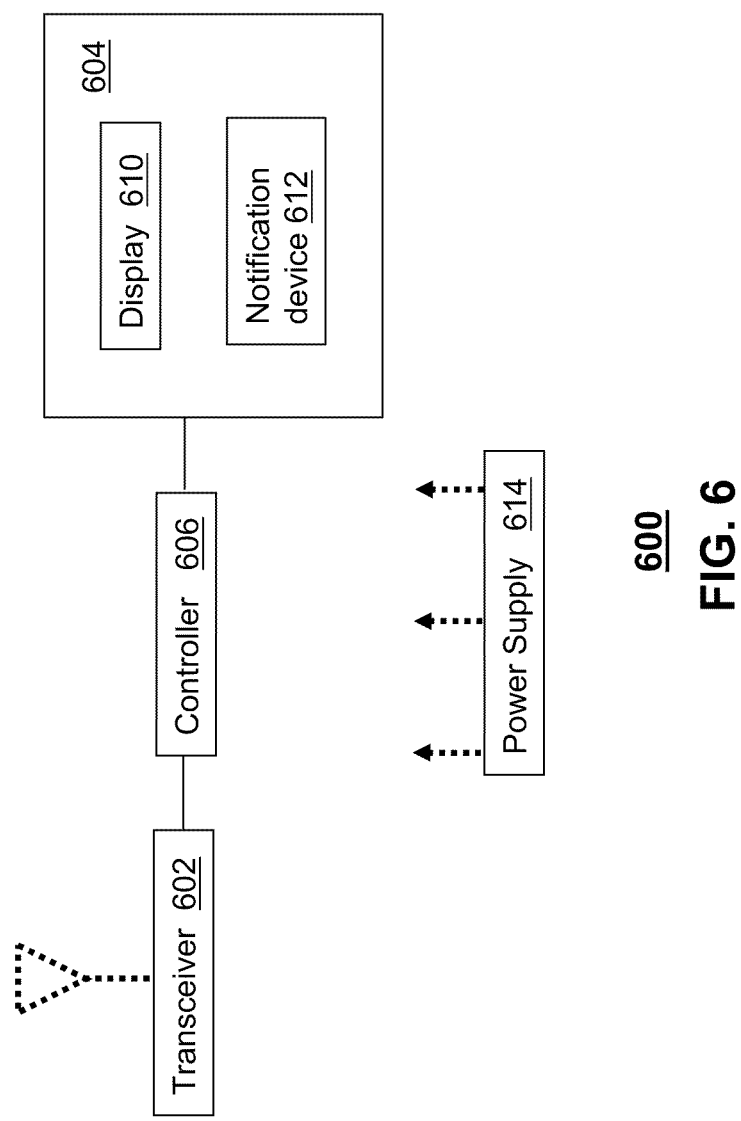
FIG. 6 depicts an illustrative embodiment of a block diagram of an apparatus of FIG. 4.

FIG. 6 depicts an illustrative embodiment of a block diagram 600 of the apparatus 401. The apparatus 401 can comprise a transceiver 602, a user interface (UI) 604, a power supply 614, and a controller 606 for managing operations thereof. The transceiver 602 can support a wireline interface such as a version of a USB interface for physically engaging with computing device 250 and/or peripheral devices 201. Other common wireline interfaces (such as Firewire and Ethernet) or proprietary wireline interfaces are contemplated by the present disclosure. The transceiver 602 can also be adapted to support wireless communications. In this latter embodiment, the transceiver 602 can utilize commonly available technology to support wireless access technologies such as Bluetooth or WiFi. Other common wireless interfaces such as Zigbee or proprietary wireless interfaces are contemplated by the present disclosure.

The UI 604 can include a display 610 such as monochrome or color LCD (Liquid Crystal Display), OLED (Organic Light Emitting Diode) or other suitable display technology for conveying images such as a menu for programming operational parameters of the apparatus 401. The UI 604 can also include a notification device 612. The notification device 612 can use common illumination technology such as an LED or OLED to inform a user of an operational state of the apparatus 401. The notification device 512 can be adapted to present two or more states of operation by way of light and/or color illumination. For example, the notification device 512 can indicate the apparatus 401 has been programmed, is in operation, is communicatively engaged with the peripheral device 201 or gaming console 250, is receiving power, and so on, according to varying color illuminations.

The apparatus 401 can have a power supply 614 which utilizes common power management technologies such as replaceable and rechargeable batteries, supply regulation technologies, and charging system technologies for supplying energy to the components of the apparatus 401. Alternatively, the charging system can utilize external power sources such as DC power supplied over a physical interface such as a USB port. Other power supply technologies suitable to the present disclosure are contemplated.

The controller 606 can utilize computing technologies such as a microprocessor, and/or an Application Specific Integrated Circuit (ASIC) operably coupled to memory such a Flash, ROM, RAM, SRAM, DRAM or combinations thereof.

Other components not shown in FIG. 6 are contemplated by the present disclosure. For instance, the apparatus 401 can include a reset button (not shown). The reset button can be used to reset the controller 606 of the apparatus 401. In yet another embodiment, the apparatus 401 can also include a factory default setting button positioned below a small hole in a housing assembly of the apparatus 401 to force the apparatus 401 to re-establish factory settings. In this embodiment, a user can use a protruding object such as a pen or paper clip tip to reach into the hole and depress the default setting button. It will be appreciated that the apparatus 401 as described herein can operate with more or less components described in FIG. 6. These variant embodiments are contemplated by the present disclosure.

Figure 7:
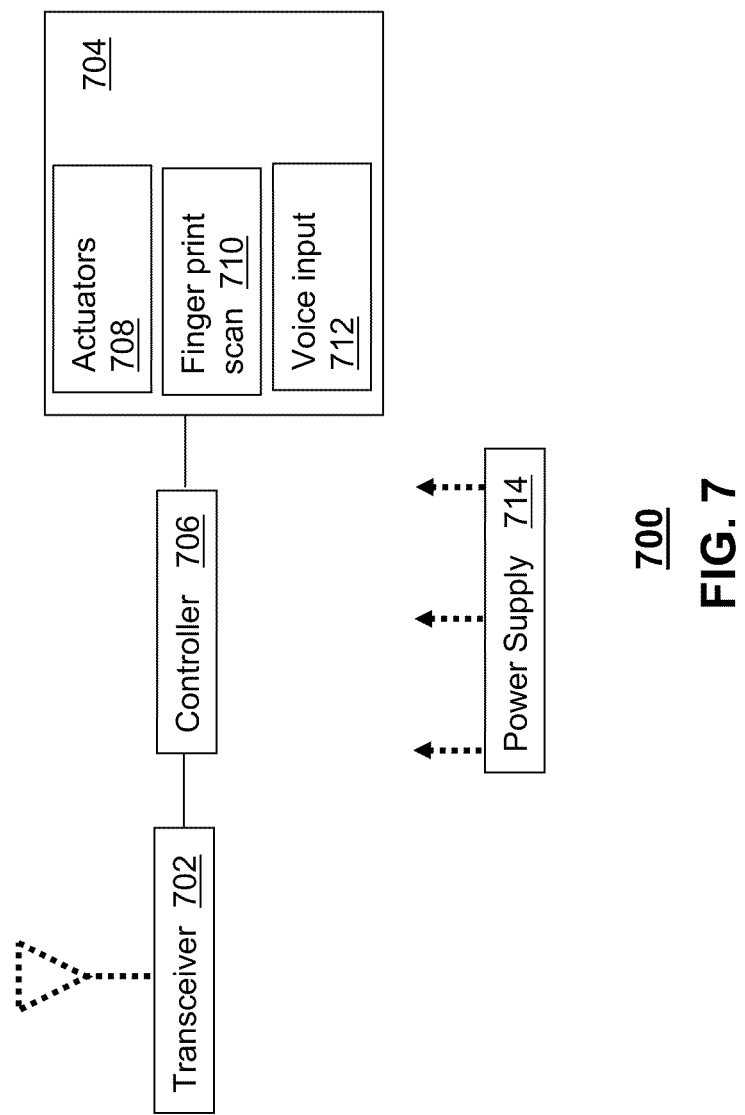
FIG. 7 depicts an illustrative embodiment of a block diagram of a gaming accessory of the systems of FIGS. 1-2 and 4-5.

FIG. 7 depicts an illustrative embodiment of a block diagram 700 of the gaming accessory or peripheral device 201. The accessory 201 can comprise a transceiver 702, a user interface (UI) 704, a power supply 714, and a controller 706 for managing operations thereof. The transceiver 702 can support a wireline interface such as a version of a USB interface for physically engaging with computing device 250. Other common wireline interfaces (such as Firewire and Ethernet) or proprietary wireline interfaces are contemplated by the present disclosure. The transceiver 702 can also be adapted to support wireless communications. In this latter embodiment, the transceiver 702 can utilize commonly available technology to support wireless access technologies such as Bluetooth or WiFi. Other common wireless interfaces such as Zigbee or proprietary wireless interfaces are contemplated by the present disclosure.

The UI 704 can include a plurality of actuators, including buttons and joysticks, that allow for user interaction with the computing device 250 and control over a video game. The UI 704 can also one or more biometric input interfaces. For instance, a finger print scanner 710 and/or a voice input component 712 can be provided that allows the accessory 201 to obtain identification information from a user of the accessory.

The accessory 201 can have a power supply 714 which utilizes common power management technologies such as replaceable and rechargeable batteries, supply regulation technologies, and charging system technologies for supplying energy to the components of the accessory 201. Alternatively, the charging system can utilize external power sources such as DC power supplied over a physical interface such as a USB port. Other power supply technologies suitable to the present disclosure are contemplated.

The controller 706 can utilize computing technologies such as a microprocessor, and/or an Application Specific Integrated Circuit (ASIC) operably coupled to memory such a Flash, ROM, RAM, SRAM, DRAM or combinations thereof. Other components not shown in FIG. 7 are contemplated by the present disclosure. For instance, the accessory 201 can include a reset button (not shown). The reset button can be used to reset the controller 706 of the accessory 201. In yet another embodiment, the accessory 201 can also include a factory default setting button positioned below a small hole in a housing assembly of the accessory to force the accessory to re-establish factory settings. In this embodiment, a user can use a protruding object such as a pen or paper clip tip to reach into the hole and depress the default setting button. It will be appreciated that the accessory 201 as described herein can operate with more or less components described in FIG. 7. These variant embodiments are contemplated by the present disclosure.

In the present context, an accessory or peripheral device 201 can represent any type of device which can be communicatively coupled to the computing device 250 and which can control aspects of the OS and/or a software application operating in the computing device. An accessory can represent for example a keyboard, a gaming pad, a mouse, a gaming console controller, a joystick, a microphone, or a headset with a microphone—just to mention a few. The keyboard and gaming pad represent accessories of a similar category since their operational parameters are alike.

A mouse can represent an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories.

Figure 8:
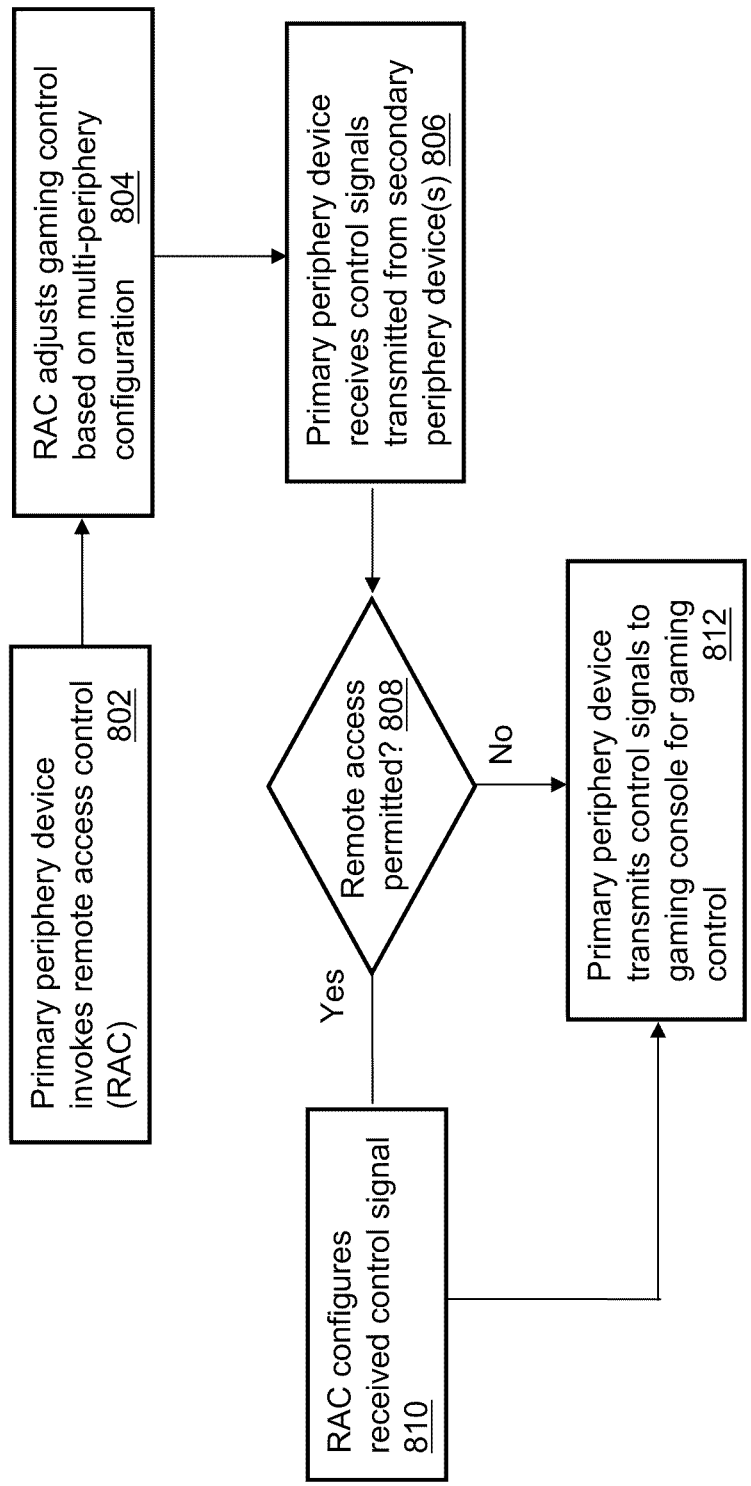
FIGS. 8-9 depict illustrative methods describing the operation of the remote access control.

FIG. 8 depicts an illustrative method 800 describing the operation of the RAC application, the peripheral devices 201 and the computing device 250. Method 800 can begin with step 802 in which a primary peripheral device invokes the RAC scheme. The revocation can be initiated at the primary device, at secondary devices or in accordance with other revocation signals, including from the gaming console 250, such as where a particular gaming software application is designated as allowing for multiple control sources of a single player of the video game. As will again be described later, an administrator (e.g., a parent) can interact with GUI 300 resulting in the selection of configuration options that designate controlling devices among a plurality of peripheral devices. The exemplary embodiments describe the interaction with GUI 300 occurring through use of a peripheral device 201, such as a joystick, where the GUI is displayed on a display device operably connected to the computing device 250. However, the interaction with GUI 300 can occur through use of other devices or components, including through use of other computing devices, including interaction over the Internet with a web page displaying the GUI 300.

Additionally, the exemplary embodiment contemplate invoking the RAC scheme independent of the gaming console. For example, the peripheral devices 201 can communicate with each other directly to configure the control options. For instance, one or more of the peripheral devices 201 can have the RAC application stored thereon and the administrator can configure the various peripheral devices for controlling designated actions associated with the single player of the video game.

In step 804, the RAC application or a relevant portion can then adjust the gaming control based on the designated multi-peripheral device configuration. The adjustment to the gaming control can be performed in a number of ways. For example, the primary peripheral device can be provided with configuration information that allows the device to determine which control signals are to be forwarded to the gaming console to exert control over the actions of the single player. This example is shown in step 806 where the primary peripheral device receives control signals from other peripheral devices and in step 808 where a determination is made as to whether the RAC scheme is applicable to the particular control signal. If applicable then in step 810 the peripheral device can process the received control signal and forward it to the gaming console.

In another embodiment, the gaming console can analyze the received control signals and determine which are permitted to exert control over the actions of the single player of the video game. In this example, the primary peripheral device can forward all control signals to the gaming console and/or the other peripheral devices can forward their control signals directly to the gaming console.

Other techniques can also be employed for allowing multiple control sources to exert control over the single player of the video game. In one embodiment, the multiple source control can be performed in coordination with instructions from the gaming software application. For instance, the gaming software application can designate particular actions that can be controlled from multiple peripheral devices.

Figure 9:
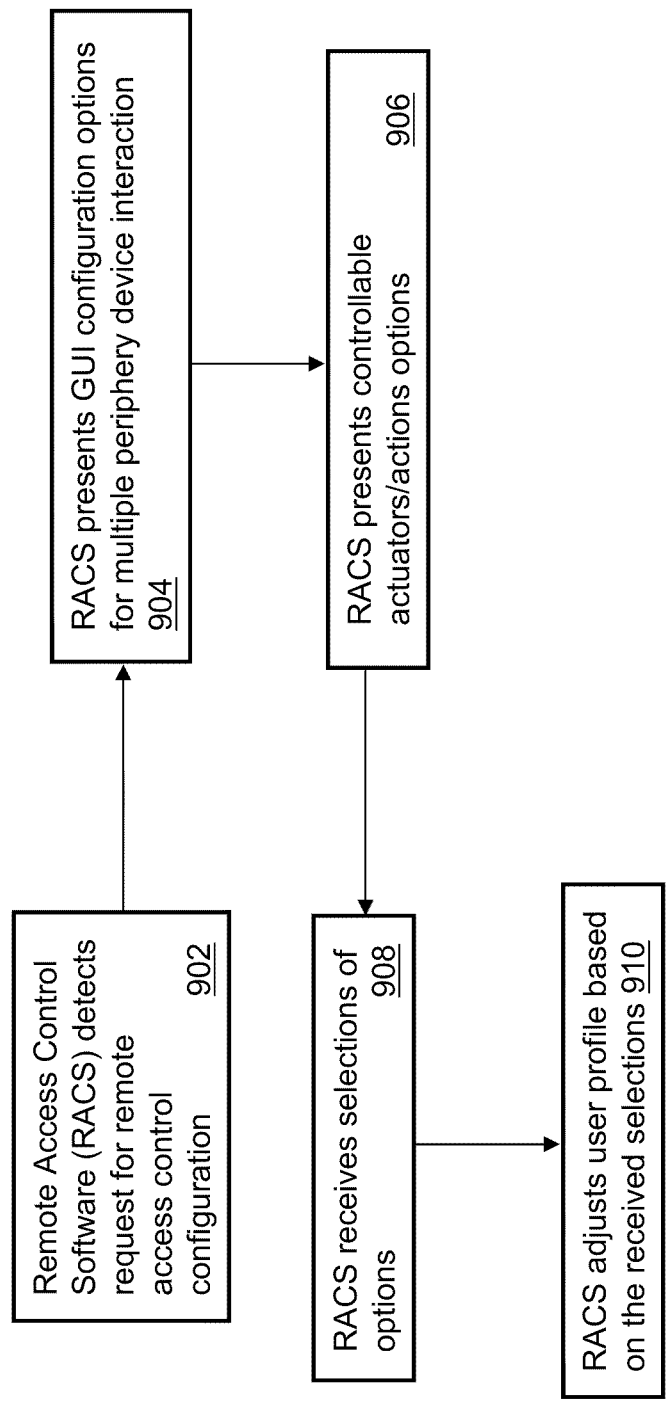

FIG. 9 depicts an illustrative method 900 describing the operation of the GUI 300 and the RAC application. Method 900 can begin with step 902 in which the RAC application detects a request for remote access control configuration. The RAC application through use of GUI 200 can present configuration options for multiple peripheral device interaction in step 904. In step 906, the RAC application can present controllable actions and/or controllable actuators of the peripheral devices (e.g., particular buttons, joysticks and so forth) through the GUI 300.

The administrator can then interact with the GUI 300 to select the configuration options and thus designate the plurality of peripheral devices that can exert control over the single player in the video game in step 908. As described earlier, the detail as to which the designations occur can vary. For instance, the administrator can designate particular actions that can be controlled only by a particular peripheral device or can be controlled by multiple devices, including providing priority of control in the event of a conflict in control signals. The level of detail can be controlled by the administrator through manipulation of the GUI 300, including downloading or otherwise accessing a list of actions that are associated with a particular video game. In step 910, the RAC application can then generate and/or adjust user profiles based on the configuration information obtained from the GUI 300 in the preceding steps. The user profiles can facilitate implementation of the RAC scheme in future use of the video game so that a user does not need to re-configure the RAC scheme.

From these illustrations, it would be apparent to an artisan of ordinary skill in the art that innumerable algorithms can be developed to analyze accessory usage and thereby suggest configurations. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, the user profiles or accounts can include group profiles associated with a plurality of users. The use of a user profile can include storing of information, through various techniques and categorization, associated with users. The particular technique used to store this information can vary.

In one embodiment, the RAC application can be utilized to customize the peripheral devices to perform various actions. In another embodiment, Vcards and the like can be utilized for storing the configuration information.

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

Figure 10:
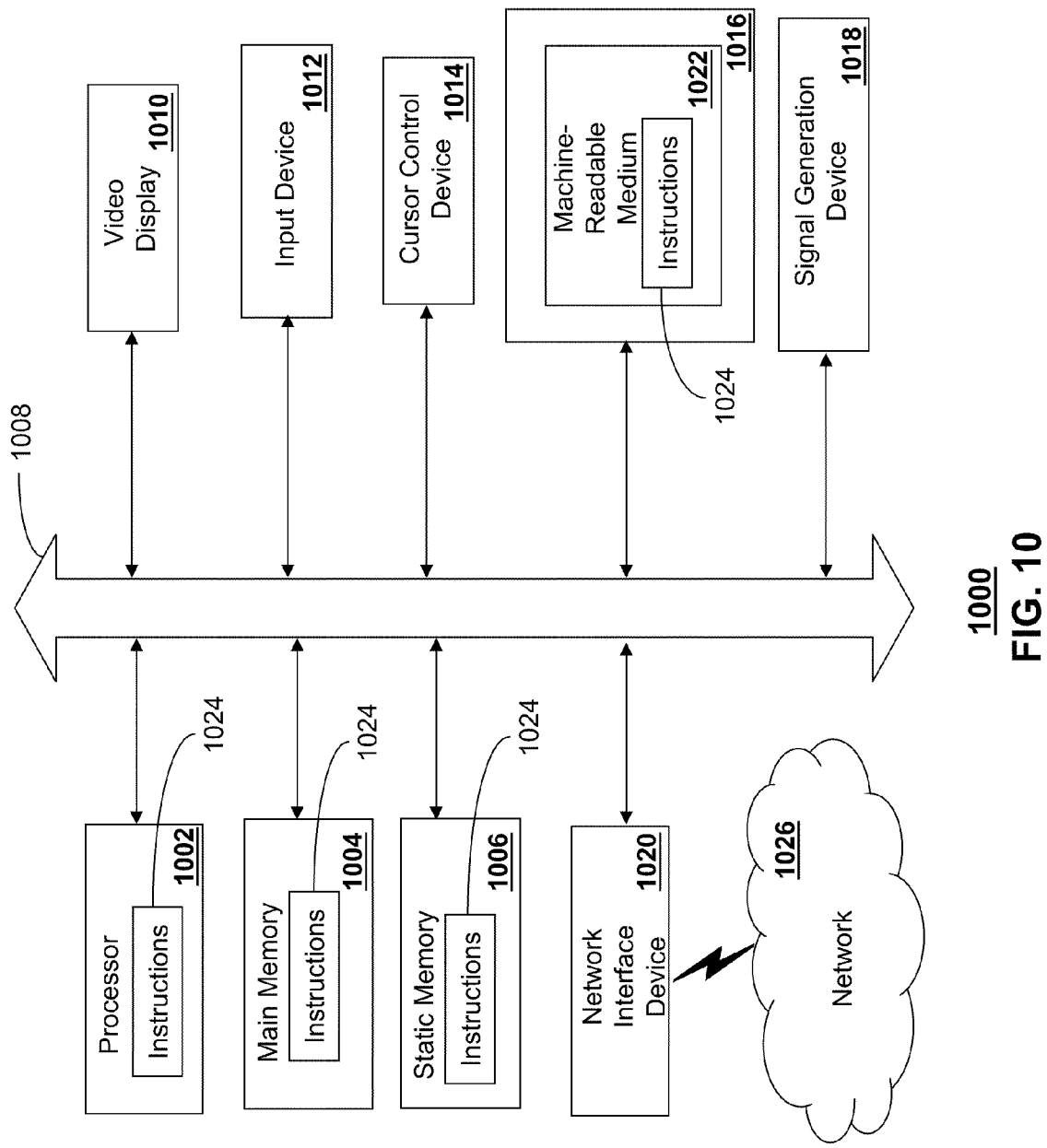
FIG. 10 depicts an illustrative diagrammatic representation of a machine in the form of a computer system within which a set of instructions, when executed, may cause the machine to perform any one or more of the methodologies disclosed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    storing, by a system comprising a processor, operational parameters for controlling functionality of a first peripheral device for use with a gaming application;
    receiving, by the system, first operational inputs corresponding to first stimulations of the first peripheral device associated with the gaming application;
    receiving, by the system at the first peripheral device, second operational inputs from a second peripheral device corresponding to second stimulations of the second peripheral device associated with the gaming application;
    generating, by the system, control signals from the first operational inputs and the second operational inputs for controlling the gaming application according to the operational parameters;
    transmitting, by the system, the control signals to the gaming application; and
    transmitting, by the system, the operational parameters of the first peripheral device to the second peripheral device for use with the gaming application.

2. The method of claim 1, wherein the first peripheral device and the second peripheral device comprise one of a mouse, a joystick, a gaming pad, and a gaming console controller wherein the transmitting of the operational parameters comprises wireless transmission between the first peripheral device and the second peripheral device.

3. The method of claim 1, wherein the wireless transmission is according to a protocol associated with one of WiFi, Bluetooth, Infrared, RFID, and wireless USB.

4. The method of claim 1, wherein the transmitting of the operational parameters of the first peripheral device comprises directly and selectively connecting a removable memory device with the first peripheral device and the second peripheral device.

5. The method of claim 1, comprising receiving, by the system, the operational parameters of the first peripheral device from a server that is remote from the first peripheral device.

6. The method of claim 5, wherein the server is remote from a gaming console hosting the gaming application.

7. A first peripheral device, comprising:
- a memory to store computer instructions; and
- a processor coupled to the memory, wherein the processor, responsive to executing the computer instructions, performs operations comprising:
  - storing operational parameters for controlling functionality of the first peripheral device for use with a gaming application;
  - receiving first operational inputs corresponding to first stimulations of the first peripheral device;
  - receiving, at the first peripheral device, second operational inputs from a second peripheral device corresponding to second stimulations of the second peripheral device;
  - generating, at the first peripheral device, control signals from the first operational inputs and the second operational inputs for controlling the gaming application according to the operational parameters;
  - controlling the gaming application according to the control signals received at the first peripheral device; and
  - transmitting the operational parameters of the first peripheral device to a second peripheral device for use with the gaming application wherein the transmitting of the operational parameters comprises wireless transmission between the first peripheral device and the second peripheral device.

8. The first peripheral device of claim 7, wherein the processor, responsive to executing the computer instructions, performs operations comprising generating the operational parameters.

9. The first peripheral device of claim 8, wherein the operational parameters are generated using a graphical user interface presented by a gaming console hosting the gaming application.

10. The first peripheral device of claim 7, wherein the processor, responsive to executing the computer instructions, performs operations comprising receiving the operational parameters from a server that is remote from a gaming console hosting the gaming application.

11. The first peripheral device of claim 7, wherein the processor, responsive to executing the computer instructions, performs operations comprising wirelessly transmitting the operational parameters to the second peripheral device.

12. The first peripheral device of claim 7, wherein the processor, responsive to executing the computer instructions, performs operations comprising transmitting the operational parameters using a plurality of different communication protocols.

13. A computer-readable storage medium comprising computer instructions which, when responsive to being executed by a processor, cause the processor to perform operations comprising:
- receiving operational parameters for controlling functionality of a first peripheral device from a server that is remote from a gaming console that is hosting a gaming application;
- storing the operational parameters in the first peripheral device, wherein the operational parameters control functionality of the first peripheral device for use with the gaming application;
- receiving first operational inputs at the first peripheral device corresponding to first stimulations of the first peripheral device;
- receiving, at the first peripheral device, second operational inputs from a second peripheral device corresponding to second stimulations of the second peripheral device:
- generating control signals from the first operational inputs and the second operational inputs for controlling the gaming application according to the operational parameters;
- transmitting the control signals to the gaming application; and
- transmitting the operational parameters to a second peripheral device for use with the gaming application wherein the transmitting of the operational parameters comprises wireless transmission between the first peripheral device and the second peripheral device.

14. The computer-readable storage medium of claim 13, comprising computer instructions which, when executed by the processor, cause the processor to perform operations comprising generating the operational parameters at the first peripheral device.

15. The computer-readable storage medium of claim 13, wherein the first peripheral device and the second peripheral device comprise one of a mouse, a joystick, a gaming pad, and a gaming console controller.

16. The computer-readable storage medium of claim 13, comprising computer instructions which, when executed by the processor, cause the processor to perform operations comprising transmitting the operational parameter by a wireless transmission from the first peripheral device to the second peripheral device.

17. The computer-readable storage medium of claim 13, comprising computer instructions which, when executed by the processor, cause the processor to perform operations comprising transmitting the operational parameters using a removable memory device that directly and selectively connects with the first and second peripheral devices.

18. The computer-readable storage medium of claim 13, comprising computer instructions which, when executed by the processor, cause the processor to perform operations comprising generating the operational parameters at the first peripheral device using a graphical user interface that is presented by the gaming console.

19. The computer-readable storage medium of claim 13, wherein the operational parameters received from the server are generated at the server using a graphical user interface that is presented by the server.

* * * * *